United States Patent
Jung et al.

(10) Patent No.: US 7,567,336 B2
(45) Date of Patent: *Jul. 28, 2009

(54) METHOD FOR MANUFACTURING LIQUID CRYSTAL DISPLAY DEVICE

(75) Inventors: Sung Su Jung, Taegu-kwangyokshi (KR); Soo Min Kwak, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/441,133

(22) Filed: May 26, 2006

(65) Prior Publication Data

US 2006/0215104 A1 Sep. 28, 2006

Related U.S. Application Data

(62) Division of application No. 10/608,371, filed on Jun. 30, 2003, now Pat. No. 7,075,611.

(30) Foreign Application Priority Data

Nov. 28, 2002 (KR) ........................ 10-2002-0074819

(51) Int. Cl.
*G02F 1/1339* (2006.01)
(52) U.S. Cl. ........................................ 349/190; 349/153
(58) Field of Classification Search ................. 349/190, 349/153
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii et al. | |
| 5,680,189 A | 10/1997 | Shimizu et al. | |

(Continued)

FOREIGN PATENT DOCUMENTS

EP 1 003 066 A1 5/2000

(Continued)

*Primary Examiner*—David Nelms
*Assistant Examiner*—David Y Chung
(74) *Attorney, Agent, or Firm*—McKenna Long & Aldridge LLP

(57) ABSTRACT

A method for manufacturing a liquid crystal display device includes providing first and second substrates; forming a main seal pattern on one of the first and second substrates by a printing method; forming a dummy sealant on the substrate having the main seal pattern by a selective dispensing method; dispensing liquid crystal material directly onto one of the first and second substrates; attaching the first and second substrates; and irradiating UV light to the attached first and second substrates.

19 Claims, 10 Drawing Sheets

U.S. PATENT DOCUMENTS

| | | | |
|---|---|---|---|
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,880,803 A * | 3/1999 | Tamai et al. | 349/156 |
| 5,952,676 A | 9/1999 | Sato et al. | |
| 5,952,678 A | 9/1999 | Ashida | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,137,559 A * | 10/2000 | Tanaka et al. | 349/153 |
| 6,163,357 A | 12/2000 | Nakamura | |
| 6,219,126 B1 | 4/2001 | von Gutfeld | |
| 6,222,603 B1 * | 4/2001 | Sakai et al. | 349/153 |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 6,573,972 B2 * | 6/2003 | Sasaki | 349/190 |
| 6,593,992 B1 * | 7/2003 | Chin et al. | 349/153 |
| 6,741,316 B2 * | 5/2004 | Park et al. | 349/153 |
| 6,791,660 B1 * | 9/2004 | Hayashi et al. | 349/190 |
| 6,819,391 B2 * | 11/2004 | Kim et al. | 349/157 |
| 6,819,392 B2 * | 11/2004 | Murata et al. | 349/187 |
| 6,859,255 B2 * | 2/2005 | Liao et al. | 349/190 |
| 7,075,611 B2 * | 7/2006 | Jung et al. | 349/153 |
| 2001/0004281 A1 * | 6/2001 | Sasaki | 349/190 |
| 2001/0021000 A1 | 9/2001 | Egami | |
| 2002/0054270 A1 | 5/2002 | Kim | |

FOREIGN PATENT DOCUMENTS

| | | |
|---|---|---|
| EP | 1 003 066 A1 A1 | 5/2000 |
| JP | 51-65656 | 6/1976 |
| JP | 51-065656 | 6/1976 |
| JP | 57-038414 | 3/1982 |
| JP | 57-038414 A1 | 3/1982 |
| JP | 57-088428 | 6/1982 |
| JP | 57-088428 A1 | 6/1982 |
| JP | 58-027126 | 2/1983 |
| JP | 58-027126 A1 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-164723 A1 | 8/1985 |
| JP | 60-217343 | 10/1985 |
| JP | 60-217343 A1 | 10/1985 |
| JP | 61-007822 | 1/1986 |
| JP | 61-007822 A1 | 1/1986 |
| JP | 61-055625 | 3/1986 |
| JP | 61-055625 A1 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-089025 A1 | 4/1987 |
| JP | 62-090622 | 4/1987 |
| JP | 62-090622 A1 | 4/1987 |
| JP | 62-205319 | 9/1987 |
| JP | 62-205319 A1 | 9/1987 |
| JP | 63-109413 | 5/1988 |
| JP | 63-109413 A1 | 5/1988 |
| JP | 63-110425 | 5/1988 |
| JP | 63-110425 A1 | 5/1988 |
| JP | 63-128315 | 5/1988 |
| JP | 63-128315 A1 | 5/1988 |
| JP | 63-311233 | 12/1988 |
| JP | 63-311233 A1 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05-127179 A1 | 5/1993 |
| JP | 05-154923 | 6/1993 |
| JP | 05-265011 | 10/1993 |
| JP | 05-265011 A1 | 10/1993 |
| JP | 05-281557 | 10/1993 |
| JP | 05-281557 A1 | 10/1993 |
| JP | 05-281562 | 10/1993 |
| JP | 05-281562 A1 | 10/1993 |
| JP | H06-018829 | 1/1994 |
| JP | 06-051256 | 2/1994 |
| JP | 06-051256 A1 | 2/1994 |
| JP | H06-064229 | 3/1994 |
| JP | 06-148657 | 5/1994 |
| JP | 06-148657 A1 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-265915 A1 | 9/1994 |
| JP | 06-313870 | 11/1994 |
| JP | 07-084268 | 3/1995 |
| JP | 07-128674 | 5/1995 |
| JP | 07-128674 A1 | 5/1995 |
| JP | 07-181507 | 7/1995 |
| JP | 07-181507 A1 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-095066 A1 | 4/1996 |
| JP | 08-101395 | 4/1996 |
| JP | 08-106101 | 4/1996 |
| JP | 08-106101 A1 | 4/1996 |
| JP | H08-110504 | 4/1996 |
| JP | H08-136937 | 5/1996 |
| JP | 08-171094 | 7/1996 |
| JP | 08-171094 A1 | 7/1996 |
| JP | 08-190099 | 7/1996 |
| JP | 08-190099 A1 | 7/1996 |
| JP | H08-173874 | 7/1996 |
| JP | 08-240807 | 9/1996 |
| JP | 08-240807 A1 | 9/1996 |
| JP | 09-005762 | 1/1997 |
| JP | 09-005762 A1 | 1/1997 |
| JP | 09-026578 | 1/1997 |
| JP | 09-026578 A1 | 1/1997 |
| JP | H09-001026 | 1/1997 |
| JP | 09-311340 | 2/1997 |
| JP | 09-61829 | 3/1997 |
| JP | 09-061829 | 3/1997 |
| JP | 09-073075 | 3/1997 |
| JP | 09-073075 A1 | 3/1997 |
| JP | 09-073096 | 3/1997 |
| JP | 09-073096 A1 | 3/1997 |
| JP | H09-094500 | 4/1997 |
| JP | 09-127528 | 5/1997 |
| JP | 09-127528 A1 | 5/1997 |
| JP | 09-230357 | 9/1997 |
| JP | 09-230357 A1 | 9/1997 |
| JP | 09-281511 | 10/1997 |
| JP | 09-281511 A1 | 10/1997 |
| JP | 09-311340 A1 | 12/1997 |
| JP | 10-031222 | 2/1998 |

| | | | | | | |
|---|---|---|---|---|---|---|
| JP | 10-123537 | 5/1998 | | JP | 2001-209057 | 8/2001 |
| JP | 10-123537 A1 | 5/1998 | | JP | 2001-209058 | 8/2001 |
| JP | 10-123538 | 5/1998 | | JP | 2001-209060 | 8/2001 |
| JP | 10-123538 A1 | 5/1998 | | JP | 2001-215459 | 8/2001 |
| JP | 10-142616 | 5/1998 | | JP | 2001-222017 | 8/2001 |
| JP | 10-142616 A1 | 5/1998 | | JP | 2001-235758 | 8/2001 |
| JP | 10-177178 | 6/1998 | | JP | 2001-215459 | 9/2001 |
| JP | H10-174924 | 6/1998 | | JP | 2001-255542 | 9/2001 |
| JP | 10-221700 | 8/1998 | | JP | 2001-264782 | 9/2001 |
| JP | 10-221700 A1 | 8/1998 | | JP | 2001-201750 | 10/2001 |
| JP | 10-282512 | 10/1998 | | JP | 2001-272640 | 10/2001 |
| JP | 10-282512 A1 | 10/1998 | | JP | 2001-281675 | 10/2001 |
| JP | 10-333157 | 12/1998 | | JP | 2001-281678 | 10/2001 |
| JP | 10-333159 | 12/1998 | | JP | 2001-282126 | 10/2001 |
| JP | 11-014953 | 1/1999 | | JP | 2001-305563 | 10/2001 |
| JP | 11-014953 A1 | 1/1999 | | JP | 2001-330837 | 11/2001 |
| JP | 11-038424 | 2/1999 | | JP | 2001-330840 | 11/2001 |
| JP | 11-038424 A1 | 2/1999 | | JP | 2001-330840 A1 | 11/2001 |
| JP | 11-064811 | 3/1999 | | JP | 2001-356353 | 12/2001 |
| JP | 11-064811 A1 | 3/1999 | | JP | 2001-356354 | 12/2001 |
| JP | 11-109388 | 4/1999 | | JP | 2001-356354 A1 | 12/2001 |
| JP | 11-109388 A1 | 4/1999 | | JP | 2002-014360 | 1/2002 |
| JP | 11-133438 | 5/1999 | | JP | 2002-014360 A1 | 1/2002 |
| JP | 11-142864 | 5/1999 | | JP | 2002-023176 | 1/2002 |
| JP | 11-174477 | 7/1999 | | JP | 2002-023176 A1 | 1/2002 |
| JP | 11-174477 A1 | 7/1999 | | JP | 2002-049045 | 2/2002 |
| JP | 11-212045 | 8/1999 | | JP | 2002-049045 A1 | 2/2002 |
| JP | 11-212045 A1 | 8/1999 | | JP | 2002-079160 | 3/2002 |
| JP | 11-248930 | 9/1999 | | JP | 2002-080321 | 3/2002 |
| JP | H11-262712 | 9/1999 | | JP | 2002-082340 | 3/2002 |
| JP | H11-264991 | 9/1999 | | JP | 2002-082340 A1 | 3/2002 |
| JP | 11-326922 | 11/1999 | | JP | 2002-090759 | 3/2002 |
| JP | 11-344714 | 12/1999 | | JP | 2002-090759 A1 | 3/2002 |
| JP | 11-344714 A1 | 12/1999 | | JP | 2002-090760 | 3/2002 |
| JP | 2000-002879 | 1/2000 | | JP | 2002-090760 A1 | 3/2002 |
| JP | 2000-029035 | 1/2000 | | JP | 2002-107740 | 4/2002 |
| JP | 2000-056311 | 2/2000 | | JP | 2002-107740 A1 | 4/2002 |
| JP | 2000-066165 | 3/2000 | | JP | 2002-122870 | 4/2002 |
| JP | 2000-066218 | 3/2000 | | JP | 2002-122872 | 4/2002 |
| JP | 2000-093866 | 4/2000 | | JP | 2002-122872 A1 | 4/2002 |
| JP | 2000-137235 | 5/2000 | | JP | 2002-122873 | 4/2002 |
| JP | 2000-147528 | 5/2000 | | JP | 2002-122873 A1 | 4/2002 |
| JP | 2000-193987 | 7/2000 | | JP | 2002-131762 | 5/2002 |
| JP | 2000-193988 | 7/2000 | | JP | 2002-139734 | 5/2002 |
| JP | 2000-241824 | 9/2000 | | JP | 2002-156518 | 5/2002 |
| JP | 2000-284295 | 10/2000 | | JP | 2002-169166 | 6/2002 |
| JP | 2000-292799 | 10/2000 | | JP | 2002-169167 | 6/2002 |
| JP | 2000-310759 | 11/2000 | | JP | 2002-182222 | 6/2002 |
| JP | 2000-310784 | 11/2000 | | JP | 2002-202512 | 7/2002 |
| JP | 2000-338501 | 12/2000 | | JP | 2002-202512 A1 | 7/2002 |
| JP | 2001-005401 | 1/2001 | | JP | 2002-202514 | 7/2002 |
| JP | 2001-005405 | 1/2001 | | JP | 2002-202514 A1 | 7/2002 |
| JP | 2001-013506 | 1/2001 | | JP | 2002-214626 | 7/2002 |
| JP | 2001-033793 | 2/2001 | | JP | 2002-214626 A1 | 7/2002 |
| JP | 2001-042341 | 2/2001 | | JP | 2002-229042 | 8/2002 |
| JP | 2001-051284 | 2/2001 | | JP | 2002-236276 | 8/2002 |
| JP | 2001-066615 | 3/2001 | | JP | 2002-258299 | 8/2002 |
| JP | 2001-091727 | 4/2001 | | JP | 2002-236292 | 9/2002 |
| JP | 2001-117105 | 4/2001 | | JP | 2002-277865 | 9/2002 |
| JP | 2001-117109 | 4/2001 | | JP | 2002-277866 | 9/2002 |
| JP | 2001-133745 | 5/2001 | | JP | 2002-277881 | 9/2002 |
| JP | 2001-133794 | 5/2001 | | JP | 2002-287156 | 10/2002 |
| JP | 2001-133799 | 5/2001 | | JP | 2002-296605 | 10/2002 |
| JP | 2001-142074 | 5/2001 | | JP | 2002-311438 | 10/2002 |
| JP | 2001-147437 | 5/2001 | | JP | 2002-311440 | 10/2002 |
| JP | 2001-154211 | 6/2001 | | JP | 2002-311442 | 10/2002 |
| JP | 2001-166272 | 6/2001 | | JP | 2002-323687 | 11/2002 |
| JP | 2001-166310 | 6/2001 | | JP | 2002-323694 | 11/2002 |
| JP | 2001-183683 | 7/2001 | | JP | 2002-328382 | 11/2002 |
| JP | 2001-201750 | 7/2001 | | JP | 2002-333628 | 11/2002 |
| JP | 2001-209050 | 8/2001 | | JP | 2002-333635 | 11/2002 |
| JP | 2001-209052 | 8/2001 | | JP | 2002-333843 | 11/2002 |
| JP | 2001-209056 | 8/2001 | | JP | 2002-341329 | 11/2002 |

| | | | | | | |
|---|---|---|---|---|---|---|
| JP | 2002-341355 | 11/2002 | | JP | 2002-3413662 | 11/2002 |
| JP | 2002-341356 | 11/2002 | | KR | 2000-0035302 | 6/2000 |
| JP | 2002-341357 | 11/2002 | | KR | 2000-035302 A1 | 6/2000 |
| JP | 2002-341358 | 11/2002 | | | | |
| JP | 2002-341359 | 11/2002 | | | | |

* cited by examiner

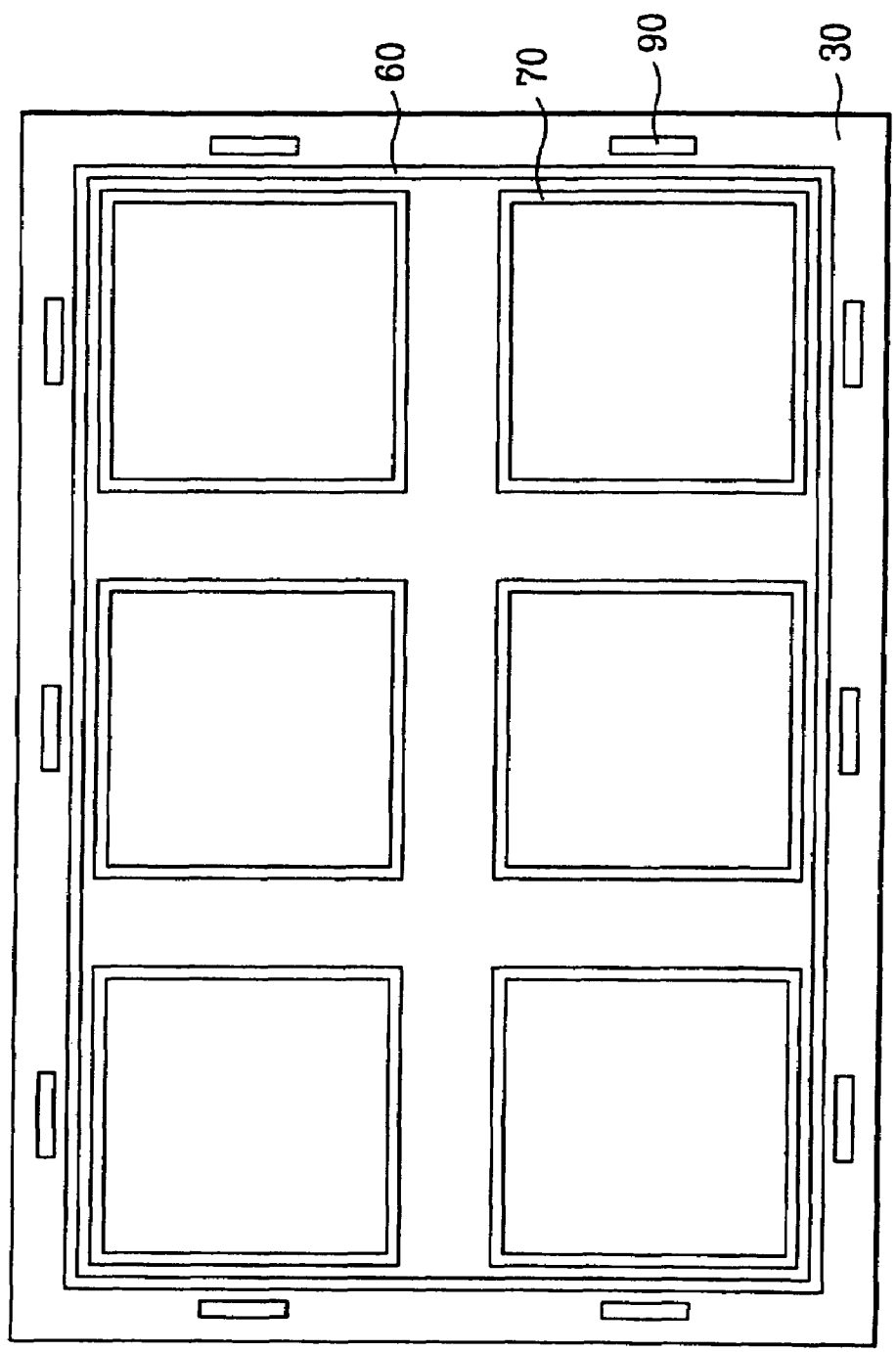

METHOD FOR MANUFACTURING LIQUID CRYSTAL DISPLAY DEVICE

This application is a Divisional of application Ser. No. 10/608,371 filed Jun. 30, 2003 now U.S. Pat. No. 7,075,611, which is hereby incorporated by reference as if fully set forth herein. This application claims the benefit of the Korean Application No. P2002-74819 filed on Nov. 28, 2002, which is hereby incorporated by reference for all purposes as if fully set forth herein. This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal display (LCD) device, and more particularly, to a method for manufacturing an LCD device while decreasing a tact time.

2. Discussion of the Related Art

With the expansion of the information society, a need has arisen for displays capable of producing high quality images in thin, lightweight packages and that consume little power. To meet such needs, research has produced a variety of flat panel display devices, including liquid crystal displays (LCD), plasma displays (PDP), electro luminescent displays (ELD), and vacuum fluorescent displays (VFD). Some of these display technologies have already been applied in information displays.

Of the various types of flat panel display devices, LCDs are very widely used. In fact, in portable devices, such as notebook PC computers, LCD technology has already replaced cathode ray tubes (CRT) as the display of choice. Moreover, even in desktop PCs and in TV monitors, LCDs devices are becoming more common.

Despite various technical developments in LCD technology, however, research in enhancing picture quality of LCD devices has been lacking compared to research in other features and advantages of LCD devices. Therefore, to increase the use of LCD devices as displays in various fields of application, LCD devices capable of expressing high quality images (e.g., images having a high resolution and a high luminance) with large-sized screens, while still maintaining a light weight, minimal dimensions, and low power consumption must be developed.

LCDs generally include an LCD panel for displaying a picture and a driving part for providing driving signals to the liquid crystal display panel.

Typically, LCD panels include first and second glass substrates bonded to each other while being spaced apart by a cell gap, wherein a layer of liquid crystal material is injected into the cell gap.

The first glass substrate (i.e., thin film transistor (TFT) array substrate), supports a plurality of gate lines spaced apart from each other at a fixed interval and extending along a first direction; a plurality of data lines spaced apart from each other at a fixed interval and extending along a second direction, substantially perpendicular to the first direction, wherein pixel regions are defined by crossings of the gate and data lines; a plurality of pixel electrodes arranged in a matrix pattern within respective ones of the pixel regions; and a plurality of thin film transistors (TFTs) capable of transmitting signal from the data lines to corresponding ones of the pixel electrodes in response to a signal applied to respective ones of the gate lines.

The second glass substrate (i.e., color filter substrate) supports a black matrix layer for preventing light leakage in areas outside the pixel regions; a color filter layer (R, G, B) for selectively transmitting light having predetermined wavelengths; and a common electrode for displaying a picture. Common electrodes of In-Plane Switching (IPS) mode LCD devices, however, are formed on the first substrate.

Uniformity of the cell gap is maintained by spacers arranged between the first and second glass substrates, bonded together by a seal pattern. The seal pattern includes a liquid crystal injection inlet allowing liquid crystal material to be injected into the cell gap. Upon injecting liquid crystal material into the cell gap via the liquid crystal injection inlet, the layer of liquid crystal material is thus formed.

The layer of liquid crystal material is driven (e.g., light transmittance characteristics of the layer of liquid crystal material are controlled) according to electric fields generated between the first and second substrates by the pixel electrode and the common electrode. By controlling the light transmittance characteristics of the layer of liquid crystal material, pictures may be displayed.

To form the aforementioned layer of liquid crystal material, related art manufacturing methods incorporate a liquid crystal injection method wherein a pressure difference is created between the cell gap and a vacuum chamber and liquid crystal material is injected into the liquid crystal injection inlet via a capillary phenomenon. A method for manufacturing the related art LCD device incorporating the liquid crystal injection method will now be described.

The first substrate (i.e., a TFT array substrate), supporting the TFTs and pixel electrodes, and the second substrate (i.e., the color filter substrate), supporting the black matrix layer, color filter layer, and common electrode, are provided. Next, spacers are dispersed on the TFT array substrate to maintain a uniform cell gap between the two substrates. A seal pattern is then formed at a periphery of the other of the two substrates to prevent liquid crystal material from leaking and to bond the two substrates together. The seal pattern is typically formed of a thermo-hardening material such as an epoxy including a mixture of an epoxy resin and an initiator. Next, a heat treatment is performed to bond the TFT array and color filter substrates to each other. When performing the heat treatment, the epoxy resin within the epoxy seal pattern is activated by the initiator and becomes a highly cross-linked polymer. As a result, the epoxy seal pattern functions as the seal pattern having suitable adhesion characteristics.

Subsequently, the bonded substrates are placed in a vacuum chamber, wherein the cell gap between the bonded substrates is maintained in a vacuum state, and dipped into a reservoir of liquid crystal material. Since a vacuum is maintained within the cell gap, liquid crystal material is injected into the cell gap by a capillary phenomenon. After a predetermined amount of liquid crystal material has been injected into the cell gap, nitrogen gas ($N_2$) is pumped into the vacuum chamber, so that liquid crystal material is injected into regions of the cell gap not previously injected into, according to the pressure difference between the cell gap and the pressure within the vacuum chamber having the pumped nitrogen gas ($N_2$). As a result, the layer of liquid crystal material is formed between the bonded TFT array and color filter substrates.

FIG. 1 illustrates a plan view illustrating a related art LCD device.

Referring to FIG. 1, the first substrate (i.e., the TFT array substrate) supports a plurality of gate lines 11 spaced apart from each other at a fixed interval and extending along a first direction and a plurality of data lines 12 spaced apart from each other at a fixed interval and extending along a second direction, substantially perpendicular to the first direction. Pixel regions P are defined by crossings of the gate and data lines 11 and 12, respectively. A plurality of pixel electrodes 16 are arranged in a matrix pattern within respective ones of the pixel regions P, and thin film transistors are formed at crossings of the plurality of gate and data lines 11 and 12, respectively. In response to signals applied from the gate lines 11, the thin film transistors transmit signals applied from the data lines 12 to respective ones of the pixel electrodes 16.

Each the thin film transistor includes a gate electrode 13 protruding from a corresponding gate line 11, a gate insulating layer (not shown) formed over an entire surface of the first substrate 10, a semiconductor layer 15 formed on the gate insulating layer in a region above the gate electrode 13, a source electrode 15a protruding from a corresponding data line 12, and a drain electrode 15b formed opposite the source electrode 15a by a predetermined distance and electrically connected to the pixel electrode 16 through a contact hole 17.

The second substrate (i.e., the color filter substrate; not shown) supports a black matrix layer having openings in regions corresponding to the pixel regions P of the first substrate 10 and prevents light leakage; an R/G/B color filter layer for selectively transmitting light having predetermined wavelengths; and a common electrode for driving the layer of liquid crystal material with the pixel electrodes 16.

The first substrate 10 is bonded to the second substrate (i.e., the color filter substrate), wherein the two substrates are spaced apart from each other by a predetermined distance, uniformly maintained by spacers. The first and second substrates are bonded to each other using a seal pattern having a liquid crystal injection inlet. Upon injecting liquid crystal material into the cell gap via the liquid crystal injection inlet, the layer of liquid crystal material is thus formed.

FIG. 2A illustrates a method of forming a seal pattern according to a screen printing method.

Referring to FIG. 2A, a screen printing apparatus includes a screen mask 32 having an opening 31 for selectively exposing a seal pattern region and a squeegee 33 for forming the seal pattern on the first substrate 10 by selectively providing sealant material to the first substrate 10 via the screen mask 32. After arranging the screen mask 32 on the first substrate 10, sealant material is disposed and the seal pattern is formed on the first substrate 10 in regions corresponding to the opening 31 by rolling a squeegee 33 over the first substrate 10 along the arrow direction in the drawing. Next, solvent within the seal pattern is evaporated in a drying process for leveling. Further, the seal pattern includes a liquid crystal injection inlet at one side thereof and is arranged at a periphery of a picture display region to prevent liquid crystal from leaking.

The aforementioned related art screen printing method is a relatively simple process to perform. However, use of the aforementioned related art screen printing method is problematic because the amount of sealant material used can be excessive. More specifically, while sealant material is disposed over the entire surface of the screen mask 32, only a small portion of the disposed sealant material is actually incorporated into the seal pattern by the squeegee 33. Further, the screen mask 32 contacts the first substrate 10. Such contact generates defects within an alignment layer (not shown) formed on the first substrate 10 because the screen mask 32 damages the alignment layer. Accordingly, a picture quality of the related art LCD device becomes deteriorated.

In order to solve the problems arising from use of the aforementioned related art screen printing method, a seal dispensing method has been proposed.

FIG. 2B illustrates a method of forming a seal pattern according to a dispensing method.

Referring to FIG. 2B, the first substrate 10 (i.e., the TFT array substrate) is loaded onto a stage (not shown) capable of moving in many directions. Next, sealant material 7 is selectively dispensed along the periphery of the first substrate 10 via a syringe apparatus 34. Though not shown in FIG. 2B (or 2A), the seal pattern 7 is typically divided into a main seal pattern and a dummy seal pattern wherein the dummy seal pattern is formed to protect the main seal pattern and to prevent liquid crystal material from leaking. Upon selectively dispensing sealant material along the periphery of the first substrate 10, a seal pattern is formed along the periphery of the first substrate 10. Using the aforementioned related art dispensing method, the amount of sealant material used may be decreased compared to the aforementioned related art screen printing method since sealant material is selectively dispensed along the periphery of the first substrate 10. Further, the syringe apparatus 34 does not contact the first substrate 10 such that damage to the alignment layer is substantially avoided and the picture quality of the LCD device is improved.

Use of the aforementioned related art dispensing method of forming the seal pattern is problematic, however, because the main and dummy seal patterns are formed of highly viscous sealant material. Accordingly, a nozzle of the syringe apparatus 34 becomes sticky with sealant material and an excessive amount of sealant material is accumulated on the nozzle. Subsequently, the excessive amount of sealant material accumulated on the nozzle becomes excessively dispensed onto the first substrate. During bonding of the first and second substrates, the excessively dispensed sealant material spreads toward an active region (center portion of the first substrate) and a dummy region (periphery of the first substrate) and the liquid crystal material becomes contaminated by the sealant material, thereby decreasing device reliability.

Further, use of the related art seal pattern formation methods may become difficult when the size of the first substrate increases, or when a size of the picture display area of the substrate changes (e.g., upon a model change of the liquid crystal display panel). In light of recent demand for liquid crystal display panels having increased size, the size of the first substrate has increased. Accordingly, positions where seal patterns are formed on the substrate change.

In the aforementioned related art dispensing method, if the positions where the seal pattern is formed on the substrate changes, the syringe apparatus must be disassembled and reassembled. As the size of liquid crystal display panels increase, the amount of time required to dispense a seal pattern having an increased size also increases. Accordingly, the tact time increases and the yield decreases.

SUMMARY OF THE INVENTION

Accordingly, the present invention is directed to a method for manufacturing a liquid crystal display device that substantially obviates one or more problems due to limitations and disadvantages of the related art.

An advantage of the present invention provides a method for manufacturing a liquid crystal display device having an improved device reliability and decreased tact time.

Another advantage of the present invention provides a method for manufacturing a liquid crystal display device capable of being applied to Multi-Model-on-a-Glass (MMG) models of liquid crystal display panels having various sizes.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described herein, a method for manufacturing an liquid crystal display device may, for example, include providing first and second substrates; forming a main sealant pattern on one of the first and second substrates via a printing method; forming a dummy sealant pattern on the substrate on which the main sealant pattern was formed via a dispensing method; dispensing liquid crystal material directly onto one of the first and second substrates; attaching the first and second substrates together; and irradiating the attached first and second substrates with UV light.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 8 illustrates UV fixation of a seal pattern according to the principles of the present invention.

DETAILED DESCRIPTION OF THE ILLUSTRATED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

As sizes of liquid crystal display panels increase, the related art method of manufacturing LCD devices incorporating the liquid crystal injection method has become problematic. More specifically, the amount of time required to completely inject liquid crystal material between two substrates increases as the size of the LCD panel increases. Accordingly, the yield with which LCD devices are manufactured decrease. In order to solve the aforementioned problem, a liquid crystal dispensing method has been proposed in accordance with the principles of the present invention.

A method for manufacturing LCD devices using the aforementioned liquid crystal dispensing method will now be described in greater detail.

FIGS. 3A to 3F illustrate process steps of manufacturing an LCD device according to the principles of the present invention.

Referring to FIGS. 3A to 3F, four LCD panels may, for example, be formed within the same base substrate. In one aspect of the present invention, the number of LCD panels formed within the same substrate may be varied according to the size of the substrate.

Figure 1:
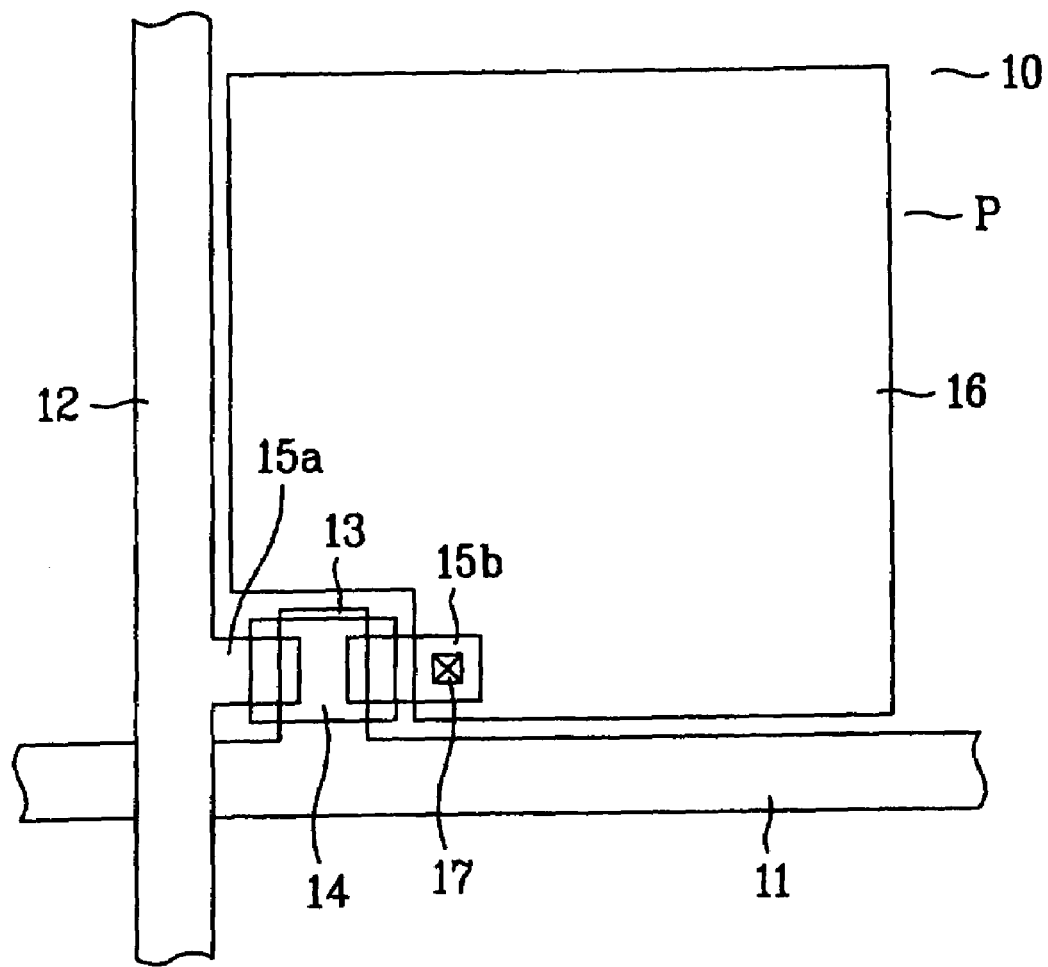
FIG. 1 illustrates a plan view illustrating a related art LCD device.
Figure 2A:
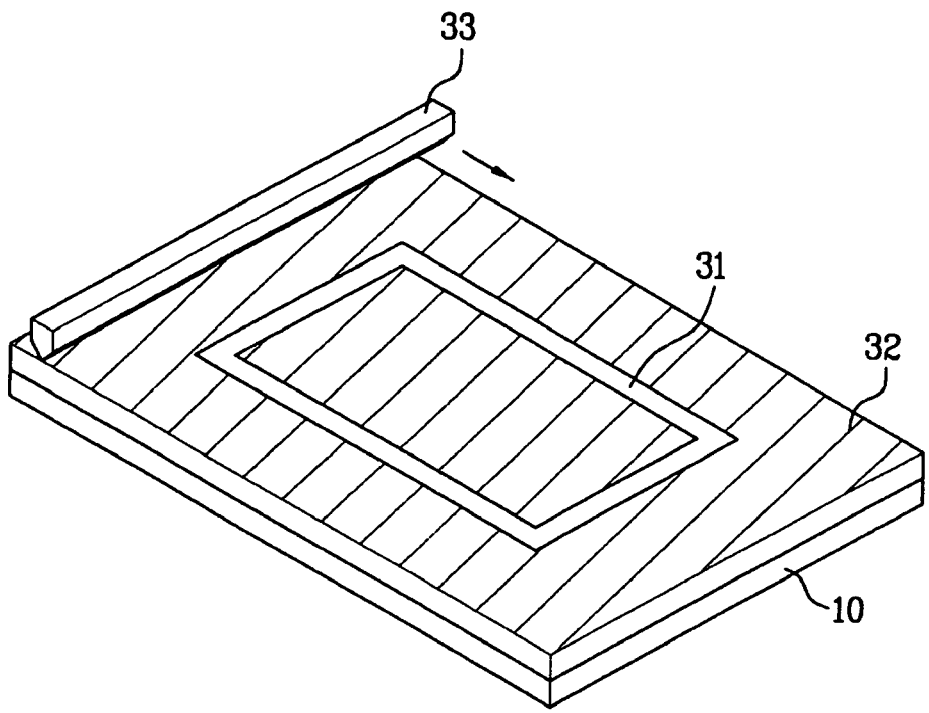
FIG. 2A illustrates a method of forming a seal pattern according to a screen printing method.
Figure 2B:
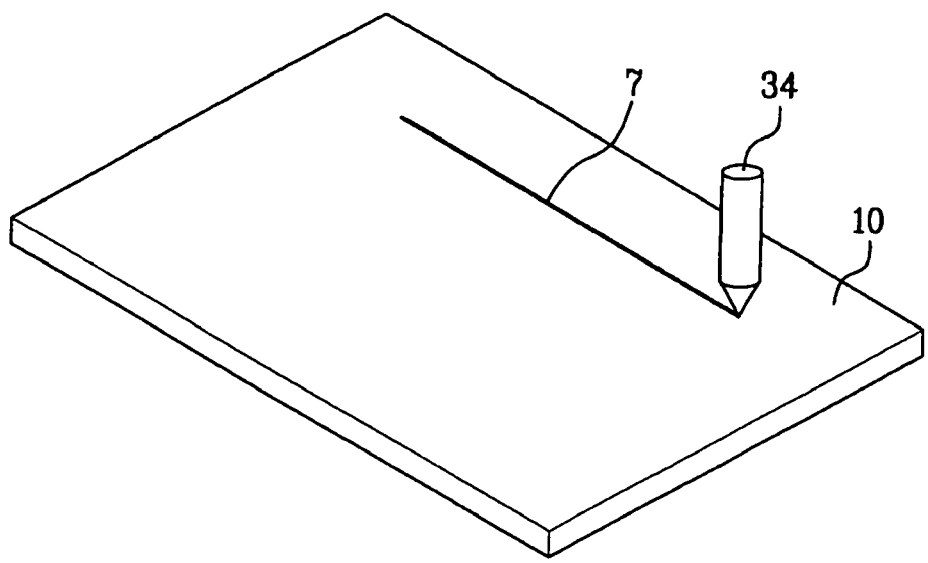
FIG. 2B illustrates a method of forming a seal pattern according to a dispensing method.
Figure 3A:
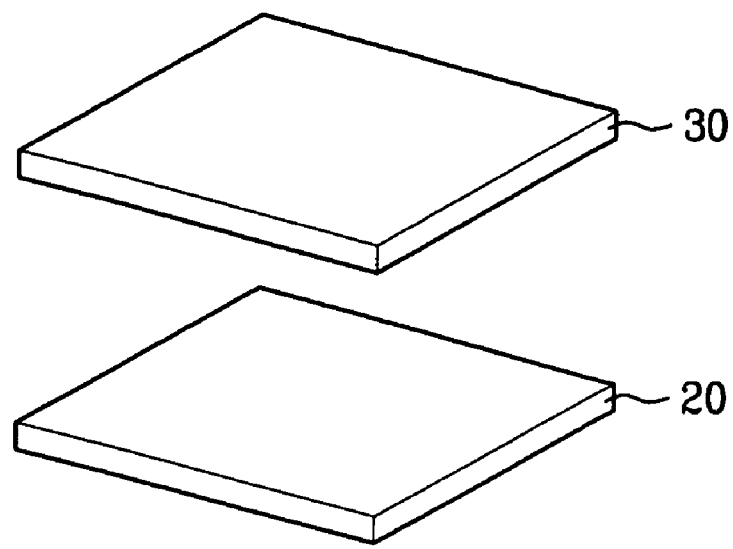
FIGS. 3A to 3F illustrate process steps of manufacturing an LCD device according to the principles of the present invention.

As shown in FIG. 3A, first and second substrates 30 and 20, respectively, may be prepared as required. Although not shown, a plurality of gate lines and a plurality of data lines crossing the gate lines may, for example, be formed on the first substrate 20 wherein a plurality of pixel regions may be defined by the crossings of the gate and data lines. Thin film transistors (TFTs) may be formed at crossings of the gate and data lines, wherein each TFT may include a gate electrode, a gate insulating layer, a semiconductor layer, an ohmic contact layer, source and drain electrodes, and a passivation layer. Further, pixel electrodes may be formed within respective ones of the plurality of pixel regions and may be connected to corresponding ones of the TFTs.

In one aspect of the present invention, an alignment layer may be formed on the pixel electrodes to impart an initial alignment direction to molecules within subsequently dispensed liquid crystal material. In one aspect of the present invention, the alignment layer may be formed of a polyamide or polyimide group compound material, polyvinylalcohol (PVA), polyamic acid, and the like. In another aspect of the present invention, the alignment direction of the alignment layer may provided via a rubbing process. In one aspect of the present invention, the alignment layer may be formed of any material having a photoreactive group including, for example, polyvinylcinnamate (PVCN), polysiloxanecinnamate (PSCN), cellulosecinnamate (CelCN), and the like. In another aspect of the present invention, the alignment direction of the alignment layer may provided via a light exposure process.

Although not shown, the second substrate 30 may, for example, support a black matrix layer, an R/G/B color filter layer, and a common electrode. The black matrix layer may substantially prevent light front leaking to the gate lines, the data lines and the TFTs. The R/G/B color filter layer may be formed on the black matrix layer and the common electrode may be formed on the color filter layer. In one aspect of the present invention, an overcoat layer may be formed between the color filter layer and the common electrode. In one aspect of the present invention, the aforementioned alignment layer may also be formed on the common electrode.

According to the principles of the present invention, silver (Ag) paste may be formed at the periphery of the first substrate 20 to facilitate the application of a voltage to the common electrode of a bonded second substrate 30. In one aspect of the present invention, the first and second substrates 20 and 30, respectively, may form an in-Plane Switching (IPS) mode LCD device. Therefore, both the common electrode and the pixel electrodes may be formed on the first substrate 20 to induce an in-plane electric field and formation of the silver (Ag) paste may not be necessary.

Figure 3B:
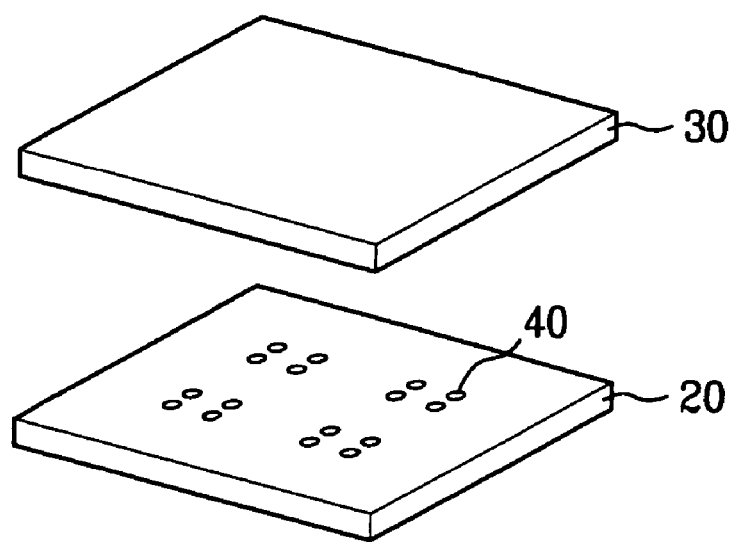
Figure 3C:
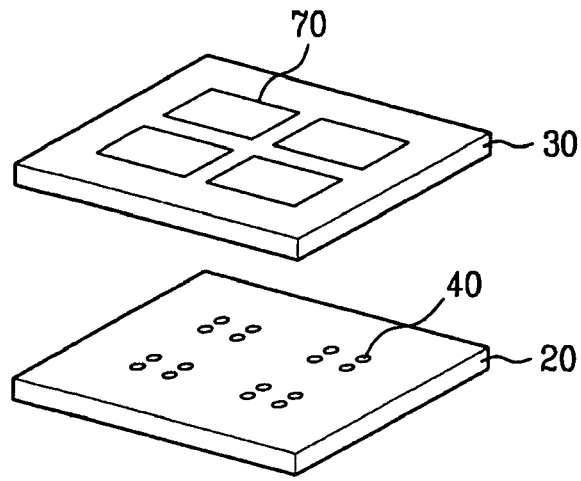

As shown in FIG. 3B, the liquid crystal material 40 may be dispensed directly onto the first substrate 20, thereby forming a layer of liquid crystal material. Subsequently, as shown in FIG. 3C, a main seal pattern 70 may be formed on the second substrate 30 via a screen printing method.

Figure 3D:
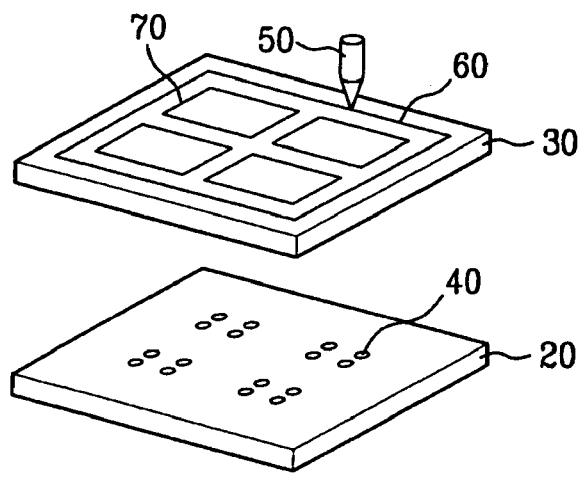

Referring to FIG. 3D, a dummy seal pattern 60 may be formed in a dummy region at the periphery of the second substrate 30 in a dispensing method using a dispensing apparatus 50. In one aspect of the present invention, the dummy seal pattern 60 may be formed to protect the main seal pattern 70 and to maintain a vacuum state of a cell gap between the first and second substrates during a subsequent bonding process. In another aspect of the present invention, the dummy seal pattern 60 may be formed substantially within any portion of the dummy region of the second substrate 30. Further, the dummy seal pattern 60 may be formed either after or before formation of the main seal pattern 70. While it has been shown in FIG. 3D that the dummy seal pattern 60 may be provided as a closed shape, the principles of the present invention may be readily extended to provide the dummy seal pattern 60 in substantially any shape, examples of which will be described in greater detail below with reference to FIGS. 4A to 4C.

According to the principles of the present invention, the main and dummy seal patterns 70 and 60, respectively, may be formed out of a sealant material that hardens upon exposure to UV light. Accordingly, in one aspect of the present invention, at least one of the main and dummy seal patterns 70 and 60 may be formed out of a sealant material including monomers or oligomers each having both ends coupled with an acrylic group mixed with an initiator. In another aspect of the present invention, at least one of the main and dummy seal patterns 70 and 60 may be formed out of a selant material including or monomers or oligomers each having one end coupled with an acrylic group and the other end coupled with an epoxy group mixed with an initiator.

As mentioned above, when the main seal pattern 70 contacts with the liquid crystal material 40 before hardening, the liquid crystal material 40 may become contaminated. Accordingly, the liquid crystal material 40 may be dispensed at the center portion of the first substrate 20. The liquid crystal material 40 dispensed at the center portion of the first substrate 20 may spread over the entire surface of the substrate until the main seal pattern 70 is hardened and after the main seal pattern 70 is hardened, such that a uniform amount of liquid crystal material is provided over the entire surface of the bonded substrates. In one aspect of the present invention, the liquid crystal material 40 may be dispensed on a different substrate than the main and dummy seal patterns 70 and 60. For example, the liquid crystal material 40 may be dispensed on the second substrate 30 while the main and dummy seal patterns 70 and 60 may be formed on the first substrate 20. Forming the liquid crystal material 40 and the main and dummy seal patterns 70 and 60 on different substrates may, however, increase the time required to manufacture the LCD because the processes required to form the main and dummy seal patterns 70 and 60 may be different from the amount of time required to dispense the liquid crystal material 40. Accordingly, in another aspect of the present invention, the liquid crystal material 40 and the main and dummy seal patterns 70 and 60 may be formed on the same substrate. Forming the liquid crystal material 40 and the main and dummy seal patterns 70 and 60 on the same substrates may make it difficult to clean the substrate because the seal patterns may be contaminated prior to bonding the two substrates together. Accordingly, and with reference to FIG. 3D, after forming the main and dummy seal patterns 70 and 60 on the second substrate 30, the second substrate 30 may be cleaned prior to the bonding process described below.

Although not shown, spacers may be formed on any one of the first and second substrates 20 and 30 to maintaining a substantially uniform cell gap between the first and second substrates 20 and 30. In one aspect of the present invention, the spacers may be formed on the second substrate 30. In another aspect of the present invention, the spacers may be provided as ball-type spacers, wherein ball-type spacers may be mixed into a solution at a predetermined density. Subsequently, the solution having the mixed-in ball-type spacers may be sprayed onto the substrate via a high pressure spraying nozzle. If ball-type spacers are applied to large-sized LCD devices, it may become difficult to maintain a uniform cell gap between the first and second substrates. Therefore, and in accordance with another aspect of the present invention, the spacers may be provided as column-type spacers such that column-type spacers may be formed over the substrate in regions corresponding to one of the gate lines, the common line, and the data lines. In one aspect of the present invention, column-type spacers may be formed on a base substrate having large-sized LCD devices disposed therein via photolithographic processes. In another aspect of the present invention the column-type spacers may be formed of a material such as a photosensitive organic resin (e.g., photo-acrylate, Benzocyclobutene (BCB), or polyimide, or the like).

Figure 3E:
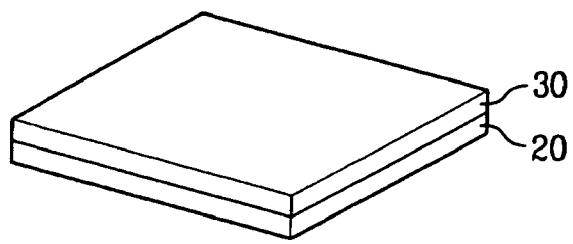

As shown in FIG. 3E, the first and second substrates 30 and 20 may be bonded together. During the bonding, the substrate onto which the liquid crystal was dispensed may be arranged beneath the other substrate such that the surface of the substrate directly contacting the dispensed liquid crystal material 40 faces toward the other substrate. The substrate onto which the seal patterns are formed may be arranged over the other substrate such that the surface of the substrate directly contacting the seal patterns faces toward the other substrate. Accordingly, the surfaces of the two substrates in direct contact with the liquid crystal material and the seal patterns oppose each other. In one aspect of the present invention, the bonding may be performed by pressing the uppermost substrate toward the lowermost substrate. In another aspect of the present invention, the bonding may be performed by releasing a vacuum state maintained between the two substrates when they are separated from each other.

Figure 3F:
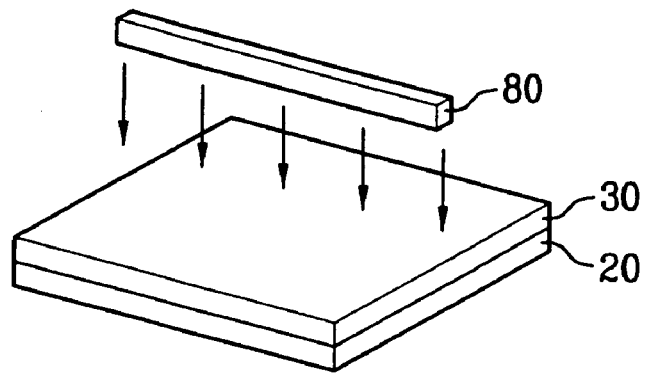

As shown in FIG. 3F, the bonded first and second substrates 20 and 30 may be irradiated with UV light via a UV irradiation apparatus 80. Upon irradiating the UV light, monomer or oligomer material within the seal patterns may become polymerized by the initiator within the seal pattern and the first and second substrates 20 and 30 may be bonded together. In one aspect of the present invention, the seal pattern may include monomers or oligomers each having one end coupled to the acrylic group and the other end coupled to the epoxy group mixed with the initiator, wherein the epoxy group is substantially inert to the UV light. In another aspect of the present invention, the seal patterns may be heated to a temperature of about 120° C. for about one hour after being irradiated by the UV light to harden the seal patterns.

Irradiating the UV light irradiation to the entire surface of the bonded substrates may affect characteristics of devices formed on the substrates (e.g., the thin film transistors) and alter pretilt angles of the alignment layers formed to initially align the liquid crystal material 40. In one aspect of the present invention, a mask (not shown) may be arranged between the UV irradiation apparatus and the bonded substrates 20 and 30 to shield active regions defined by the main seal patterns 70. Although not shown, after the aforementioned UV irradiation process, the bonded substrates may be cut into individual LCD panels and an inspection process may be performed.

According to the principles of the present invention, the layer of liquid crystal material may be formed according to a liquid crystal injection method instead of the liquid crystal dispensing method. Therefore, the main and dummy seal patterns 70 and 60 may be formed within the same plane. Moreover, the dummy seal pattern may maintain a substantially uniform cell gap within a non-display (e.g., dummy) region and the main seal patterns may include liquid crystal injection inlets.

Figure 4A:
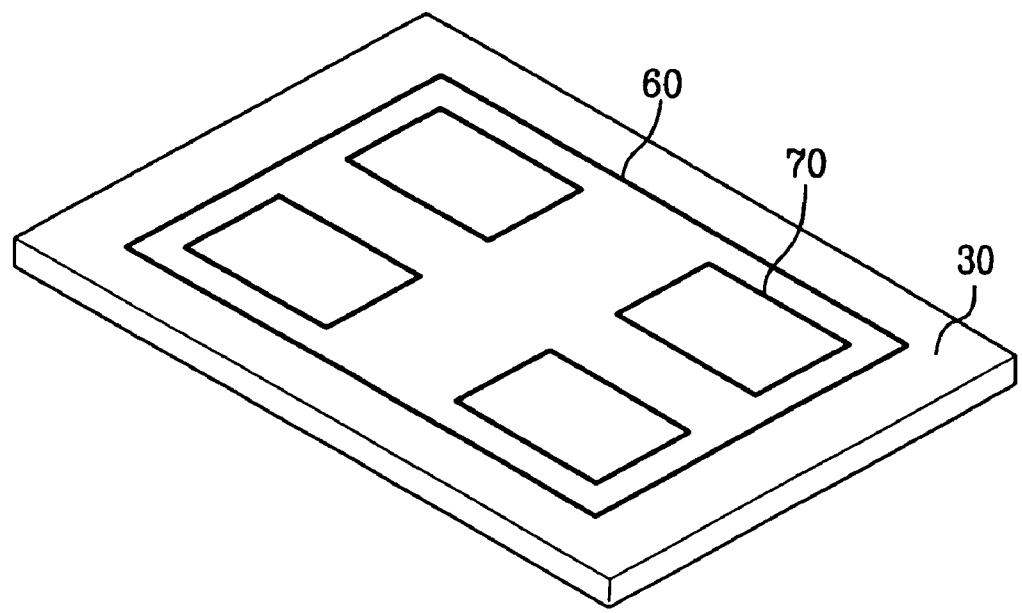
FIGS. 4A to 4C illustrate dummy seal patterns according to the principles of the present invention.
Figure 4B:
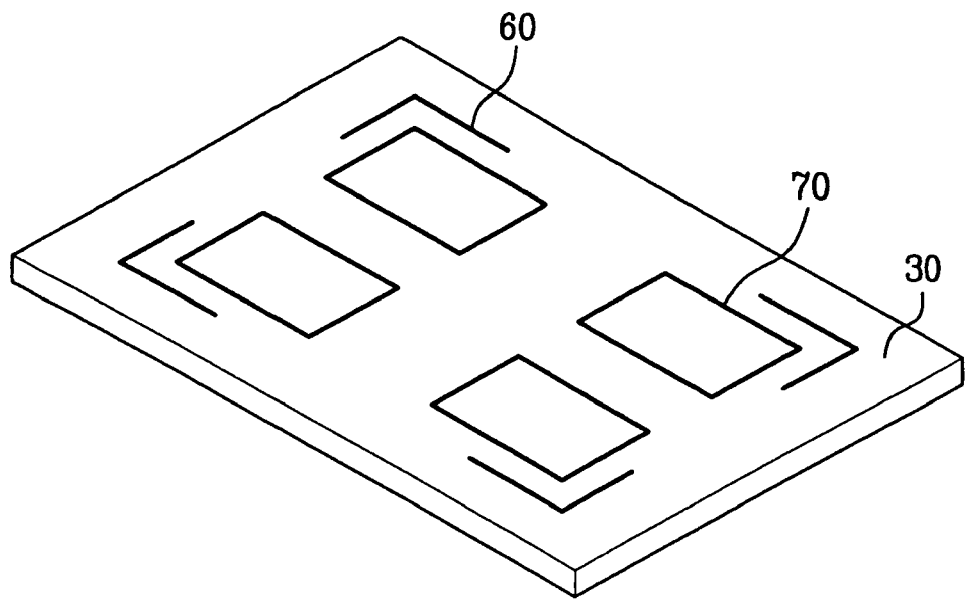
Figure 4C:
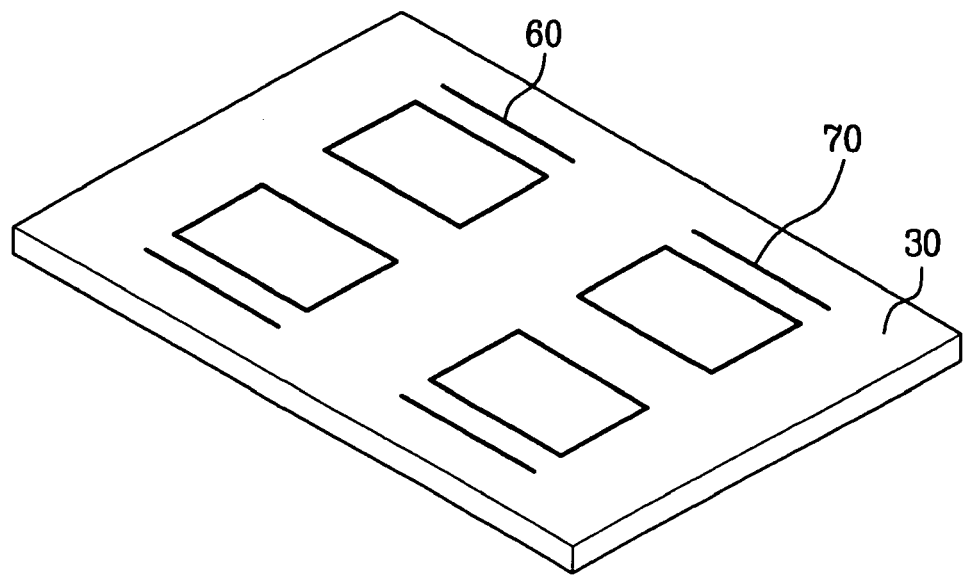

FIGS. 4A to 4C illustrate dummy seal patterns according to the principles of the present invention.

Referring to FIGS. 4A to 4C, the main seal pattern 70, provided as a plurality of main seal patterns 70, may arranged on the second substrate 30 as a closed shape having no liquid crystal injection inlet while the dummy seal pattern 60 may be provided within the dummy region at the periphery of the main seal patterns 70 in substantially any shape.

Referring specifically to FIG. 4A, the dummy seal pattern 60 may be provided at the periphery of the main seal patterns 70 in a closed shape. Alternatively, and while referring to FIG. 4B, the dummy seal pattern 60 may be provided as a plurality of dummy seal sub-patterns 60 arranged at corners of the second substrate 30 where the main seal pattern 70 is formed. In one aspect of the present invention, the plurality of dummy seal sub-patterns 60 may be provided as "L"-type shapes arranged to surround portions of respective main seal patterns 70. Alternatively, and while referring to FIG. 4C, the plurality of dummy seal sub-patterns 60 may be provided as substantially straight-type shapes arranged at outer peripheral sides of respective ones of the main seal patterns 70. In one aspect of the present invention, the dummy seal patterns 60 shown in FIGS. 4A to 4C may be formed out of a material including monomers or oligomers each having both ends coupled with an acrylic group mixed with an initiator. In another aspect of the present invention, the dummy seal patterns 60 shown in FIGS. 4A to 4C may be formed out of a material including monomers or oligomers each having one end coupled with an acrylic group and the other end coupled with an epoxy group mixed with an initiator.

Figure 5A:
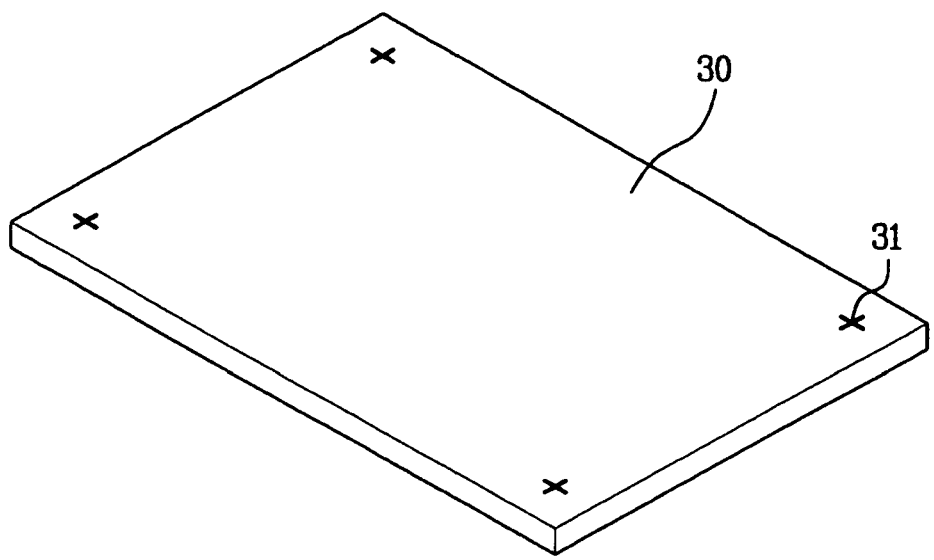
FIGS. 5A to 5C illustrate a method of forming a main seal pattern according to a screen printing method in accordance with the principles of the present invention.
Figure 5B:
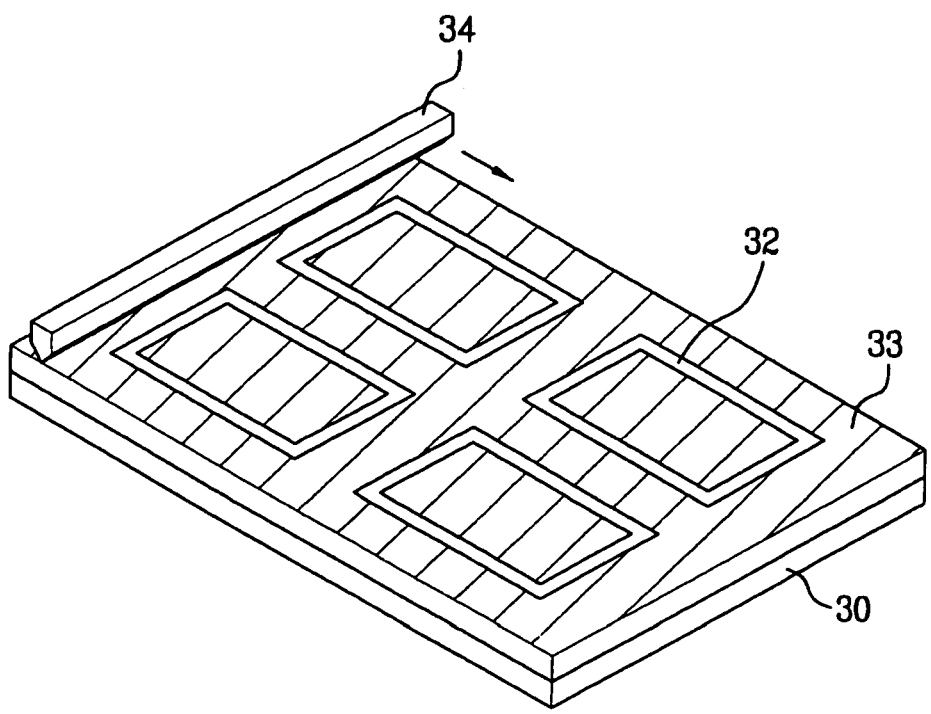
Figure 5C:
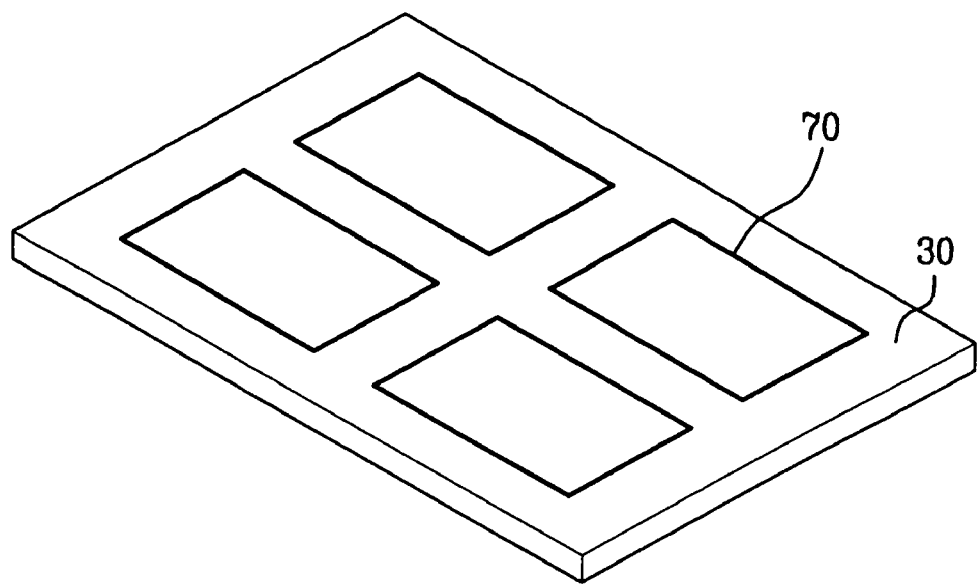

FIGS. 5A to 5C illustrate a method of forming a main seal pattern according to a screen printing method in accordance with the principles of the present invention.

Referring to FIG. 5A, a plurality of alignment marks 31 may be formed on the surface of at least one of the first and second substrates 20 and 30, respectively, (e.g., the second substrate 30). In one aspect of the present invention, at least two alignment marks 31 may be arranged at respective corners of the second substrate 30. In another aspect of the present invention, the at least two alignment marks 31 may be arranged in diagonally opposite corners of the second substrate 30. In another aspect of the present invention, four alignment marks 31 may be arranged at respective corners of the second substrate 30. In yet another aspect of the present invention, four alignment marks 31 may be arranged at corners of liquid crystal display panels within the second substrate 30. In still another aspect of the present invention, the plurality of alignment marks 31 may be provided as various shape-types (e.g., at least one of a +-type shape, a X-type shape, a rectangular shape, a circular shape, etc.).

Figure 6A:
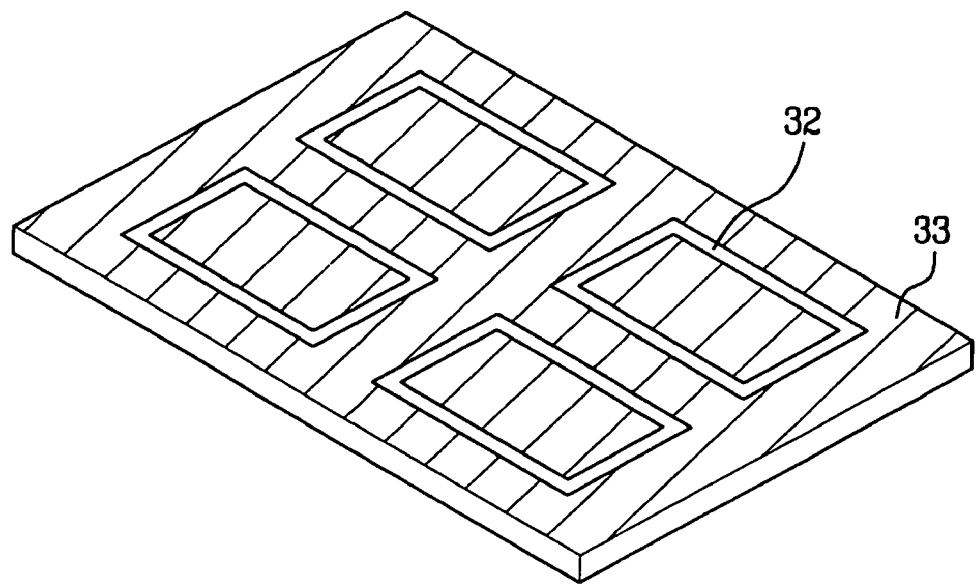
FIG. 6A illustrates a plan view of a one piece screen mask.

Referring to FIG. 5B, a screen mask 33 may be arranged over the second substrate 30. Further, the screen mask 33 may be provided with a plurality of openings 32 capable of being aligned over predetermined regions of the second substrate 30 using the plurality of alignment marks 31. After aligning the screen mask 33, a sealant material may be disposed over a predetermined portion of the screen mask 33 and a squeegee 34 may be rolled over the screen mask 33 along the arrow direction shown in FIG. 5B to force sealant material within the openings 32. Consequently, and as shown in FIG. 5C, four main seal patterns 70 may be formed on the second substrate 30 in correspondence to the plurality of openings 32 wherein the four main seal patterns 70 may be used to fabricate four LCD panels. In one aspect of the present invention, the screen mask 33 may be provided as a one piece screen mask as shown in FIG. 6A. In another aspect of the present invention, the screen mask 33 may be provided as a division screen mask as shown in FIG. 6B.

Referring to FIG. 6A, upon forming the main seal patterns 70 corresponding to the four LCD panels, the main seal patterns 70 may be printed using a one piece screen mask 33 having a plurality of openings 32 used to a form a plurality of main seal patterns 70. According to the principles of the present invention, the size of the one piece screen mask is limited to a maximum size. Therefore, it becomes difficult to effectively use remaining portions of large-sized base substrates (i.e., portions of the base substrate within which LCD panels are not formed) and the cost of manufacturing LCD panels may be excessively large. Further, the size of the one piece screen mask must be increased in accordance with the size of the LCD panel. As the size of LCD panels increases, the size of the one piece screen mask also increases, thereby making the one piece screen mask difficult to maintain and handle.

Figure 6B:
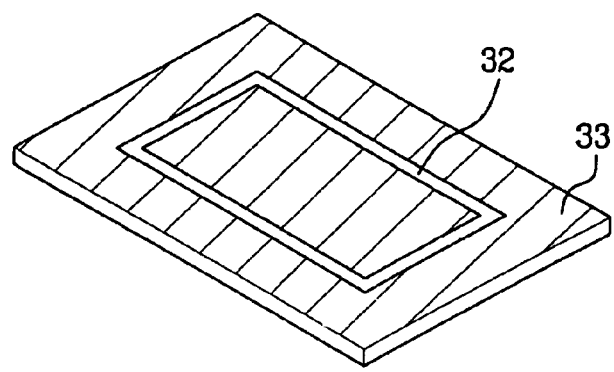
FIG. 6B illustrates a plan view of a division screen mask.

Referring to FIG. 6B, upon forming the main seal patterns 70 corresponding to the four LCD panels, the main seal patterns may be printed using a division screen mask 33 having a single opening 32 corresponding to dimensions of an LCD panel. According to the principles of the present invention, the main seal pattern 70 may be arranged on the second substrate 30 corresponding the LCD panel. Subsequently, a sealant material may be disposed over the division screen mask 33 and the main seal pattern 70 may be printed in a region of the second substrate 30 corresponding to a first LCD panel region via a squeegee 34 (as in FIG. 5B). Next, the division screen mask 33 may be re-arranged in another region of the second substrate 30 corresponding to a second LCD panel region and another main seal pattern 70 may be printed on the second LCD panel region. By providing the screen mask 33 as a division screen mask, the aforementioned processes may be repeated to form a predetermined number of printed main seal patterns in regions of the second substrate corresponding to LCD panel regions. As a result, any number main seal patterns 70 (e.g., four) may be printed on the within corresponding LCD panel regions of the same base substrate.

According to the principles of the present invention, a plurality of LCD panels having different sizes may be formed within the same base substrate using the division screen mask 33. When forming a plurality of LCD panels having substantially the same size within the same substrate, it becomes difficult to efficiently use remaining portions of the base substrate since the size of the remaining portion of the base substrate is typically smaller than the size of the LCD panels that are formed. Accordingly, the efficiency with which the substrate may be used decreases. However, when a plurality of different sized LCD panels (e.g., a first plurality of LCD panels having a first size and a second plurality of LCD panels having a second size, smaller than the first size) are formed within the same base substrate, the efficiency with which the base substrate is used increases. In one aspect of the present invention, the second plurality of LCD panels may be formed within a remaining portion of the substrate even though the first plurality of LCD panels cannot be formed within the remaining portion.

A method for fabricating a plurality of different sized LCD panels in accordance with the principles of the present invention will now be described in greater detail below.

Figure 7:
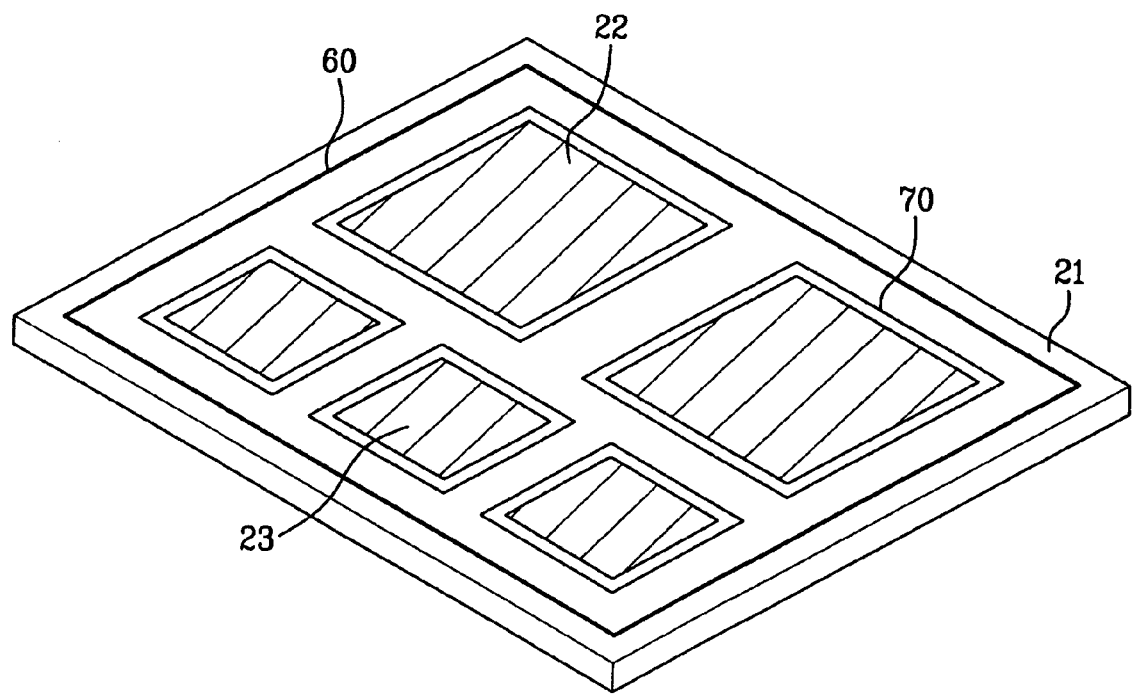
FIG. 7 illustrates an exemplary MMG model including a plurality of different sized LCD panels disposed within the same base substrate.

FIG. 7 illustrates an exemplary MMG model including a plurality of different sized LCD panels disposed within the same base substrate.

Referring to FIG. 7, a first plurality of LCD panels 22 having a first size may be formed within a base substrate 21 and a second plurality of LCD panels 23 having a second size, smaller than the first size, may be formed within a remaining portion of the base substrate 21. According to the principles of the present invention, when only the first plurality of LCD panels 22 are formed within the base substrate 21, the remaining portion of the base substrate, having a size suitable for accommodating the second plurality of LCD panels 23 cannot be used and the base substrate 21 is used inefficiently. Accordingly, the first and second plurality of LCD panels, having the different sizes, may be formed within the same base substrate to optimize use of the base substrate. Subsequently, the plurality of main seal patterns 70 may be formed on the base substrate 21 at the periphery of first and second plurality of LCD panels 22 and 23. In one aspect of the present invention, the plurality of main seal patterns 70 may be formed on the base substrate by a printing method. Next, the aforementioned dummy seal pattern 60 may be formed at the periphery of the main seal patterns 70 via a dispensing method wherein sealant material is selectively dispensed directly onto the base substrate 21.

FIG. 8 illustrates UV fixation of a seal pattern according to the principles of the present invention.

Referring to FIG. 8, the aforementioned seal patterns may be formed of a photo-hardening type sealant material (e.g., a UV hardening-type resin), wherein the main seal patterns 70 seal liquid crystal material between two bonded substrates within the LCD panels, and wherein the dummy seal pattern 60 surrounds the plurality of LCD panels, protects the main seal patterns 70, and maintains a vacuum state between the substrates during the bonding and pressing processes. In one aspect of the present invention, a fixation seal pattern 90 may be provided at fixed intervals at a periphery of the dummy seal pattern 60, proximate edges of the second substrate 30. In another aspect of the present invention, the fixation seal pattern 90 may fix the two bonded substrates and may be removed in a subsequent cutting operation used to divide the bonded substrates into a plurality of LCD panels.

After forming the fixation seal patterns 90, the two substrates may be bonded to each other. Subsequently, UV light may be irradiated to the fixation seal patterns 90, thereby hardening the fixation seal patterns 90. As a result, the two substrates bonded to each other are fixed. In one aspect of the present invention, the main seal pattern 70, the dummy seal pattern 60, and the fixation seal pattern 90 may be formed on the second substrate 30. In another aspect of the present invention, the fixation seal pattern 90 may be formed on the first substrate. In still another aspect of the present invention, the fixation seal pattern 90 may be formed of a different material from the main seal pattern 70. In yet another aspect of the present invention, the fixation seal pattern 90 may be formed of the same material as the main seal pattern 70 and the fixation seal pattern 90 may be formed on the same substrate as the main seal pattern 70 (e.g., the second substrate 30). In still another aspect of the present invention, the fixation seal pattern 90 may be formed of the different material from the main seal pattern 70 and the fixation seal pattern 90 may be formed on a different substrate from the main seal pattern 70 or on the same substrate as the main seal pattern 70 (e.g., the second substrate 30). In one aspect of the present invention, the main seal pattern 70 and the liquid crystal may be formed on the first substrate 20 while the fixation seal pattern 90 may be formed on the second substrate 30. In another aspect of the present invention, the fixation seal pattern 90 and the liquid crystal material may be formed on the first substrate 20, and either the main or dummy seal pattern 70 or 60 may be formed on the second substrate 30. In still another aspect of the present invention, the fixation seal pattern 90 may be formed via the aforementioned dispensing method whereby sealant material is selectively dispensed onto the substrate. In yet another aspect of the present invention, the fixation seal pattern 90 may be formed at the periphery of the dummy seal pattern 60 or substantially collinear with the dummy seal pattern 60.

The aforementioned method of manufacturing LCD devices in accordance with the present invention is advantageous because the main seal pattern may be formed by a screen printing method and the dummy seal pattern may be formed by a dispensing method. Accordingly, contamination of the liquid crystal material may be prevented, thereby improving yield and device reliability. Further, main seal patterns may be printed onto a base substrate (e.g., a large-sized substrate) using a division screen mask or a one piece screen mask. Still further, main seal patterns corresponding to LCD panels of different sizes may be formed on the same base substrate. Moreover, a tact time may be decreased.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of fabricating a display device, comprising:
providing first and second substrates having;
forming a main seal pattern on one of the first and second substrates by a screen printing process;
forming a dummy seal pattern on the one of the first and second substrates by a selective dispensing process;
forming a fixation seal pattern at a proximate edges of one of the first and second substrates;
providing a layer of liquid crystal material; and
bonding the first and second substrates together, wherein a plurality of liquid crystal display panels are disposed within the bonded first and second substrates, wherein the layer of liquid crystal material is arranged between the bonded first and second substrates.

2. The method according to claim 1, wherein the main seal pattern is formed as a plurality of closed shapes, substantially surrounding each of the plurality of liquid crystal display panels.

3. The method according to claim 1, wherein the dummy seal pattern is formed as a closed shape, substantially surrounding the main seal pattern.

4. The method according to claim 1, wherein the dummy seal pattern is formed as a plurality sub-patterns having a predetermined shape arranged at corners of the one of the first and second substrates.

5. The method according to claim 1, further comprising:
arranging a screen mask over the one of the first and second substrates, wherein the screen mask includes at least one opening, wherein the at least one opening corresponds a respective liquid crystal display panel disposable within the bonded first and second substrates;

disposing sealant material on the screen mask; and forcing the sealant material into the at least one opening.

6. The method according to claim 5, wherein the at least one opening includes a single opening.

7. The method according to claim 5, wherein the at least one opening includes a plurality of openings.

8. The method according to claim 5, further comprising:

providing at least two alignment marks; and aligning the at least one opening of the screen mask with a respective liquid crystal display panel using the at least two alignment marks.

9. The method according to claim 1, wherein the providing the layer of liquid crystal material includes selectively dispensing liquid crystal material directly onto one of the first and second substrates.

10. The method according to claim 9, wherein the selectively dispensing liquid crystal material includes selectively dispensing the liquid crystal material directly onto the one of the first and second substrates.

11. The method according to claim 9, wherein the selectively dispensing liquid crystal material includes selectively dispensing the liquid crystal material directly onto the first or second substrate other than the one of the first and second substrates.

12. The method according to claim 1, wherein the providing the layer of liquid crystal material includes injecting liquid crystal material between the bonded first and second substrates.

13. The method according to claim 1, wherein the plurality of liquid crystal display panels are substantially the same size.

14. The method according to claim 1, wherein the plurality of liquid crystal display panels have different sizes.

15. The method according to claim 1, wherein the forming the fixation seal pattern includes forming the fixation seal pattern proximate edges of the one of the first and second substrates.

16. The method according to claim 1, wherein the forming the fixation seal pattern includes forming the fixation seal pattern proximate edges of the first or second substrate other than the one of the first and second substrates.

17. The method according to claim 1, wherein the forming the fixation seal pattern includes selectively dispensing sealant material onto one of the first and second substrates.

18. The method according to claim 1, further comprising arranging the fixation seal pattern at a periphery of the dummy seal pattern.

19. The method according to claim 1, further comprising arranging the fixation seal pattern to be substantially collinear with the dummy seal pattern.

* * * * *